United States Patent
Kim

(10) Patent No.: US 7,557,632 B2
(45) Date of Patent: Jul. 7, 2009

(54) INTERNAL CLOCK GENERATOR AND METHOD OF GENERATING INTERNAL CLOCK

(75) Inventor: Chang Il Kim, Kyeongki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 67 days.

(21) Appl. No.: 11/633,011

(22) Filed: Dec. 4, 2006

(65) Prior Publication Data

US 2007/0241801 A1    Oct. 18, 2007

(30) Foreign Application Priority Data

Apr. 18, 2006    (KR) .................. 10-2006-0034992

(51) Int. Cl.
*H03K 3/00* (2006.01)
(52) U.S. Cl. .................. 327/299; 327/263; 327/172
(58) Field of Classification Search ......... 327/172–176, 327/261, 263, 291, 293, 294, 298, 299
See application file for complete search history.

(56) References Cited

U.S. PATENT DOCUMENTS

| 5,517,137 | A | * | 5/1996 | Stephens, Jr. ................ 326/93 |
| 5,642,068 | A | * | 6/1997 | Wojcicki et al. ............. 327/172 |
| 6,049,241 | A | * | 4/2000 | Brown et al. ................ 327/295 |
| 6,122,220 | A | * | 9/2000 | Kim et al. ................ 365/233.1 |
| 6,903,592 | B2 | * | 6/2005 | Faue ............................ 327/291 |
| 7,205,814 | B2 | * | 4/2007 | Park ............................ 327/291 |

* cited by examiner

*Primary Examiner*—An T Luu
(74) *Attorney, Agent, or Firm*—Lowe Hauptman Ham & Berner, LLP

(57) ABSTRACT

An internal clock generator includes a detector, an internal signal generator and a clock output unit. The detector detects a transition point of an external clock signal and outputting a detection signal. The internal signal generator generates an internal signal in response to the detection signal and a pulse width control signal. The clock output unit outputs an internal clock signal having a pulse width, which is set based on the internal signal. A transition point of an external clock signal is detected and an internal clock signal is generated based on the detection result. It is therefore possible to maintain the pulse width of the internal clock signal to a set value regardless of variation in the pulse width of the external clock signal.

24 Claims, 5 Drawing Sheets

INTERNAL CLOCK GENERATOR AND METHOD OF GENERATING INTERNAL CLOCK

CROSS-REFERENCES TO RELATED APPLICATIONS

The present application claims priority to Korean patent application number 10-2006-034992, filed on Apr. 18, 2006, which is incorporated by reference in its entirety.

BACKGROUND OF THE INVENTION

The present invention relates, in general, to semiconductor devices and, more particularly, to an internal clock generator for generating an internal clock signal and a method of generating an internal clock.

In general, a semiconductor memory device that performs data input and output operations in synchronization with a clock signal, such as Synchronous Dynamic Random Access Memory (SDRAM), includes an internal clock generator. The internal clock generator generates an internal clock signal based on an external clock signal received from an external device.

FIG. 1 is a circuit diagram of a conventional internal clock generator. Referring to FIG. 1, the internal clock generator 10 includes an input buffer 11, a delay circuit 12 and a clock output unit 13. The clock output unit 13 includes PMOS transistors P1 and P2, NMOS transistors N1 and N2, and an inverter 14. The operational process of the internal clock generator 10 will be described below in short with reference to FIG. 2.

FIG. 2 is a timing diagram showing signals related to the operation of the internal clock generator shown in FIG. 1. The input buffer 11 receives an external clock signal EXCLK and outputs it to the clock output unit 13. The delay circuit 12 delays the external clock signal EXCLK for a set time and outputs a delay clock signal DXCLK. The clock output unit 13 outputs an internal clock signal INCLK in response to the external clock signal EXCLK and the delay clock signal DXCLK. Preferably, whenever both the external clock signal EXCLK and the delay clock signal DXCLK become a high level, the clock output unit 13 outputs the internal clock signal INCLK as a high level. Meanwhile, a pulse width of the external clock signal EXCLK may be changed depending on process, voltage and temperature (hereinafter, referred to as "PVT"). If the pulse width of the external clock signal EXCLK is changed as described above, the pulse width of the internal clock signal INCLK can be changed. In particular, in the internal clock generator 10 that generates the internal clock signal INCLK based on a logic state of the external clock signal EXCLK, the pulse width of the internal clock signal INCLK is significantly influenced by variation in the pulse width of the external clock signal EXCLK. In other words, the narrower the pulse width of the external clock signal EXCLK, the narrower the pulse width of the internal clock signal INCLK, and the wider the pulse width of the external clock signal EXCLK, the wider the pulse width of the internal clock signal INCLK. In general, in the specification of Double Data Rate (DDR) SDRAM, the pulse width of the external clock signal EXCLK is set to a specific value. However, in the specification of SDRAM, there is no special limit to the pulse width of the external clock signal EXCLK. In this case, if the pulse width of the external clock signal EXCLK is reduced excessively, severe SDRAM malfunctions may occur. This is because if the pulse width of the external clock signal EXCLK is reduced excessively, the internal clock generator 10 cannot generate the internal clock signal INCLK. In more detail, for example, if the pulse width of the external clock signal EXCLK is "D1" (that is, a time in which the external clock signal EXCLK is kept to a high level is longer than a delay time of the delay circuit 12), as shown in FIG. 2, the internal clock generator 10 normally generates the internal clock signal INCLK. However, if the pulse width of the external clock signal EXCLK is "D2" (that is, a time in which the external clock signal EXCLK is kept to a high level is shorter than a delay time of the delay circuit 12), there is no period in which the external clock signal EXCLK and the delay clock signal DXCLK are at a high level at the same time. Accordingly, the internal clock generator 10 cannot generate the internal clock signal INCLK. As a result, the internal clock generator 10 cannot keep the pulse width of the internal clock signal INCLK constant if the pulse width of the external clock signal EXCLK is changed.

SUMMARY OF THE INVENTION

Accordingly, the present invention addresses the above problems, and discloses an internal clock generator, in which it detects a transition point of an external clock signal and generates an internal clock signal based on the detection result, whereby a pulse width of the internal clock signal can be kept to a set value regardless of variation in the pulse width of the external clock signal.

The present invention further discloses a method of generating an internal clock, in which it detects a transition point of an external clock signal and generates an internal clock signal based on the detection result, whereby a pulse width of the internal clock signal can be kept to a set value regardless of variation in the pulse width of the external clock signal.

An internal clock generator according to an aspect of the present invention includes a detector, an internal signal generator and a clock output unit. The detector detects a transition point of an external clock signal and outputting a detection signal. The internal signal generator generates an internal signal in response to the detection signal and a pulse width control signal. The clock output unit outputs an internal clock signal having a pulse width, which is set based on the internal signal.

A method of generating an internal clock according to another aspect of the present invention includes the steps of detecting a transition point of an external clock signal and outputting a detection signal, generating an internal signal in response to the detection signal and a pulse width control signal, and outputting an internal clock signal having a pulse width set based on the internal signal.

DESCRIPTION OF SPECIFIC EMBODIMENTS

Now, specific embodiments according to the present patent will be described with reference to the accompanying drawings.

Figure 1:
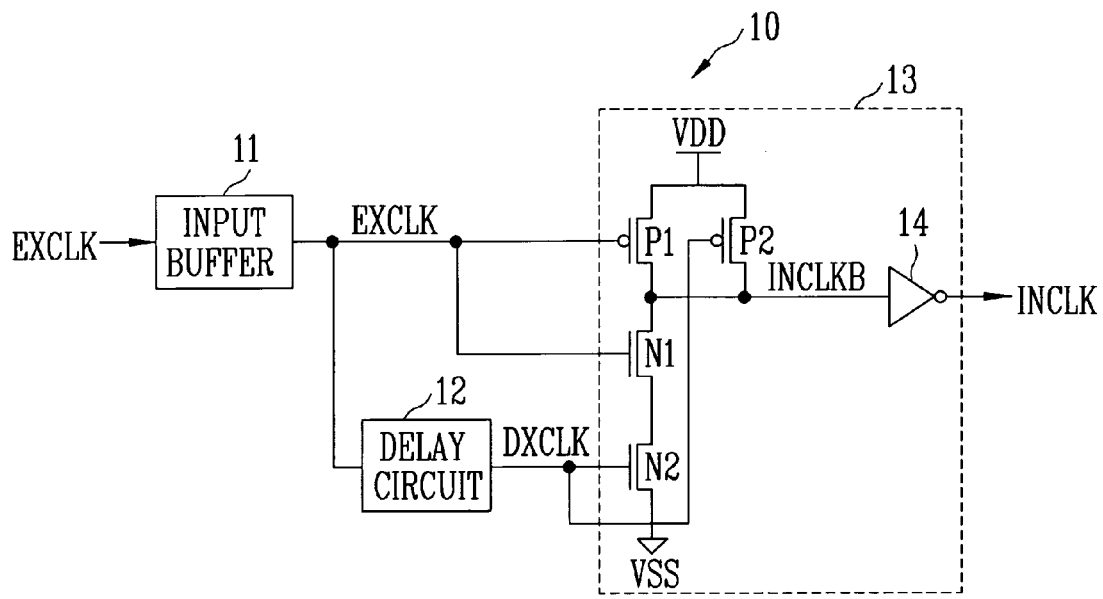
FIG. 1 is a circuit diagram of a conventional internal clock generator.
Figure 2:
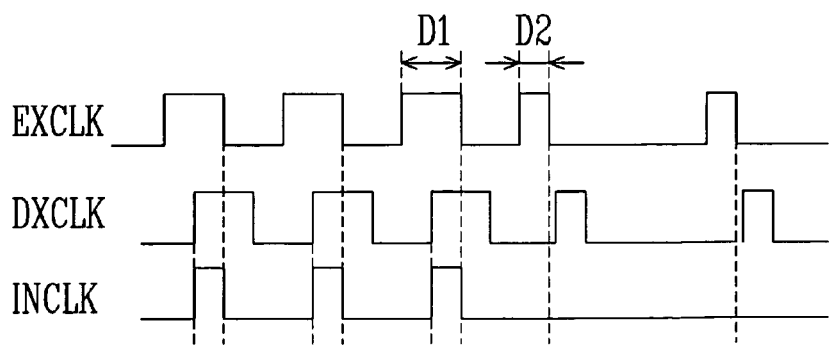
FIG. 2 is a timing diagram showing signals related to the operation of the internal clock generator shown in FIG. 1.
Figure 3:
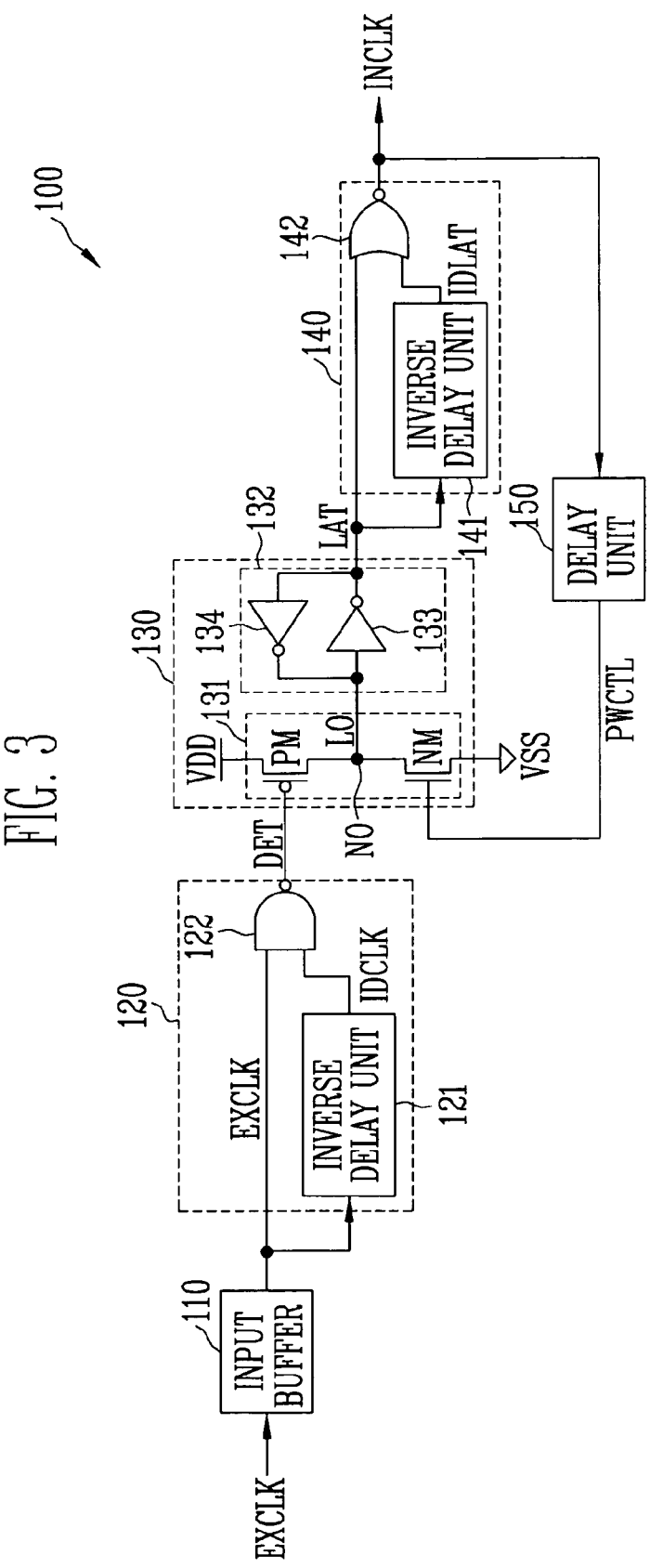
FIG. 3 is a circuit diagram of an internal clock generator according to an embodiment of the present invention.
Figure 4:
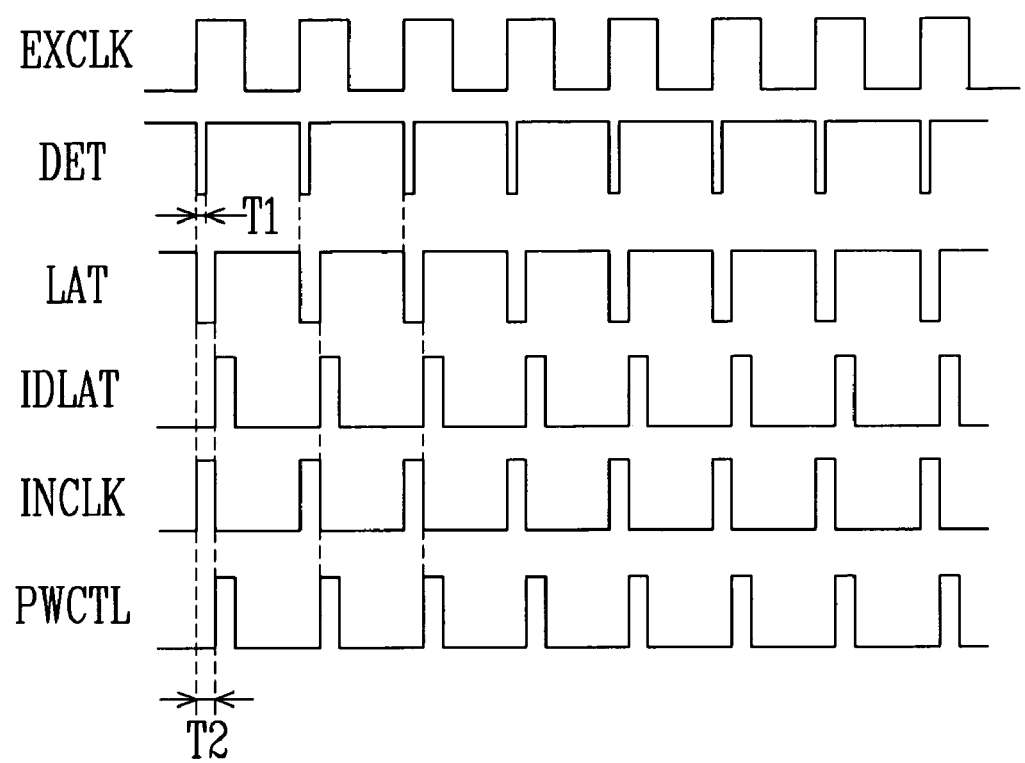
FIG. 4 is a timing diagram showing signals related to the operation of the internal clock generator shown in FIG. 3.

FIG. 3 is a circuit diagram of an internal clock generator according to an embodiment of the present invention. Referring to FIG. 3, the internal clock generator 100 includes an input buffer 110, a detector 120, an internal signal generator 130, a clock output unit 140 and a delay unit 150. The input buffer 110 receives an external clock signal EXCLK and outputs it to the detector 120. The detector 120 detects a transition point of the external clock signal EXCLK and outputs a detection signal DET. In more detail, the detector 120 includes an inverse delay unit 121 and a logic circuit 122. The inverse delay unit 121 inverts the external clock signal EXCLK received from the input buffer 110, delays the inverted signal for a set time T1 (refer to FIG. 4), and outputs an inverted delay signal IDCLK. The set time T1 may be decreased or increased, if appropriate. The logic circuit 122 outputs the detection signal DET in response to the external clock signal EXCLK and the inverted delay signal IDCLK. Preferably, the logic circuit 122 may be implemented using a NAND gate. In this case, the logic circuit 122 outputs the detection signal DET as a low level when both the external clock signal EXCLK and the inverted delay signal IDCLK are at a high level. The external clock signal EXCLK is toggled periodically. Accordingly, the detector 120 outputs the detection signal DET in a low pulse signal fashion that is periodically generated whenever a rising edge of the external clock signal EXCLK is detected, as shown in FIG. 4. The internal signal generator 130 generates an internal signal LAT in response to the detection signal DET and a pulse width control signal PWCTL. The internal signal generator 130 includes an output circuit 131 and a latch circuit 132. The output circuit 131 outputs an internal clock signal LO to an output node NO in response to the detection signal DET and the pulse width control signal PWCTL. The output circuit 131 includes switches PM and NM. Preferably, the switch PM may be implemented using a PMOS transistor and the switch NM may be implemented using a NMOS transistor. The switch PM is connected between a power supply voltage VDD and an output node NO and is turned on or off in response to the detection signal DET. Preferably, whenever the detection signal DET becomes a low level, the switch PM is turned on and supplies the power supply voltage VDD to the output node NO. As a result, the internal clock signal LO is generated at a high level from the output node NO. The switch NM is connected between the output node NO and a ground voltage VSS and is turned on or off in response to the pulse width control signal PWCTL. Preferably, whenever the pulse width control signal PWCTL becomes a high level, the switch NM is turned on and supplies the ground voltage VSS to the output node NO. As a result, the internal clock signal LO is generated at a low level from the output node NO. Preferably, whenever one of the switches PM and NM is turned on, the other of the switches PM and NM is turned off. The latch circuit 132 latches the internal clock signal LO and outputs the internal signal LAT. The latch circuit 132 includes inverters 133 and 134. The inverter 133 inverts the internal clock signal L0 and outputs an inverted signal as the internal signal LAT. The inverter 134 inverts the internal signal LAT and outputs an inverted signal to an input terminal of the inverter 133. Consequently, the latch circuit 132 outputs the internal signal LAT of a low level when the internal clock signal LO is a high level, and outputs the internal signal LAT of a high level when the internal clock signal LO is a low level. The clock output unit 140 outputs an internal clock signal INCLK having a set pulse width based on the internal signal LAT. In more detail, the clock output unit 140 includes an inverse delay unit 141 and an output logic circuit 142. The inverse delay unit 141 inverts the internal signal LAT, delays the inverted signal for a set time T2 (refer to FIG. 4), and outputs an inverted delay signal IDLAT. The set time T2 may be increased or decreased, if needed. The output logic circuit 142 outputs the internal clock signal INCLK in response to the internal signal LAT and the inverted delay signal IDLAT. Preferably, the output logic circuit 142 may be implemented using a NOR gate 142. In this case, the output logic circuit 142 outputs the internal clock signal INCLK as a high level when both the internal signal LAT and the inverted delay signal IDLAT are a low level. The delay unit 150 delays the internal clock signal INCLK for a time, which is the same as or longer than the set time T2, and outputs a delayed signal to as the pulse width control signal PWCTL. Preferably, the pulse width of the internal clock signal INCLK is decided according to a delay time set in the inverse delay unit 141 and delay time set in the delay unit 150. For example, when the delay time of the inverse delay unit 141 and the delay time of the delay unit 150 are increased, the pulse width of the internal clock signal INCLK is increased. In contrast, when the delay time of the inverse delay unit 141 and the delay time of the delay unit 150 are decreased, the pulse width of the internal clock signal INCLK is decreased.

An operational process of the internal clock generator 100 will be described below in more detail with reference to FIG. 4. FIG. 4 is a timing diagram showing signals related to the operation of the internal clock generator shown in FIG. 3. There is shown in FIG. 4 a timing diagram showing signals related to the operation of the internal clock generator 100 when the delay time of the inverse delay unit 141 and the delay time of the delay unit 150 are set to T2, as an example. The input buffer 110 receives the external clock signal EXCLK and outputs it to the detector 120. The detector 120 outputs the detection signal DET in a low pulse signal fashion whenever a rising edge of the external clock signal EXCLK is detected. The output circuit 131 of the internal signal generator 130 outputs the internal clock signal LO of a high level when the detection signal DET is a low level. The latch circuit 132 of the internal signal generator 130 latches the internal clock signal L0 at a high level and outputs the internal signal LAT at a low level. The inverse delay unit 141 of the clock output unit 140 inverts the internal signal LAT, delays it for a set time T2 and outputs the inverted delay signal IDLAT. The output logic circuit 142 of the clock output unit 140 outputs the internal clock signal INCLK, which is kept at a high level while both the internal signal LAT and the inverted delay signal IDLAT are at a low level. Thereafter, the delay unit 150 delays the internal clock signal INCLK for the set time T2 and outputs the pulse width control signal PWCTL. The output circuit 131 outputs the internal clock signal LO at a low level in response to the pulse width control signal PWCTL at a high level. The latch circuit 132 latches the internal clock signal L0 at a low level and outputs the internal signal LAT at a high level. The clock output unit 140 outputs the internal clock signal INCLK, which is kept at a low level while the internal signal LAT is at a high level. The internal clock generator 100 outputs the internal clock signal INCLK that repeatedly toggles the above operation. In the operational process of the above-described internal clock generator 100, when the detection signal DET becomes low, the internal signal LAT becomes low, and when the pulse width control signal PWCTL becomes high, the logic state of the internal signal LAT stays the same. Furthermore, when the pulse width control signal PWCTL becomes high, the internal signal LAT becomes high, and when the detection signal DET becomes low, the logic state of the internal signal LAT stays the same. As described above, in the internal clock generator 100, the pulse width of the internal clock signal INCLK is decided by the delay time of the inverse delay unit 141 and the delay time of the delay unit 150. Accordingly, the internal clock generator 100 can generate the internal clock signal INCLK having a constant pulse width although the pulse width of the external clock signal EXCLK is changed.

Figure 5:
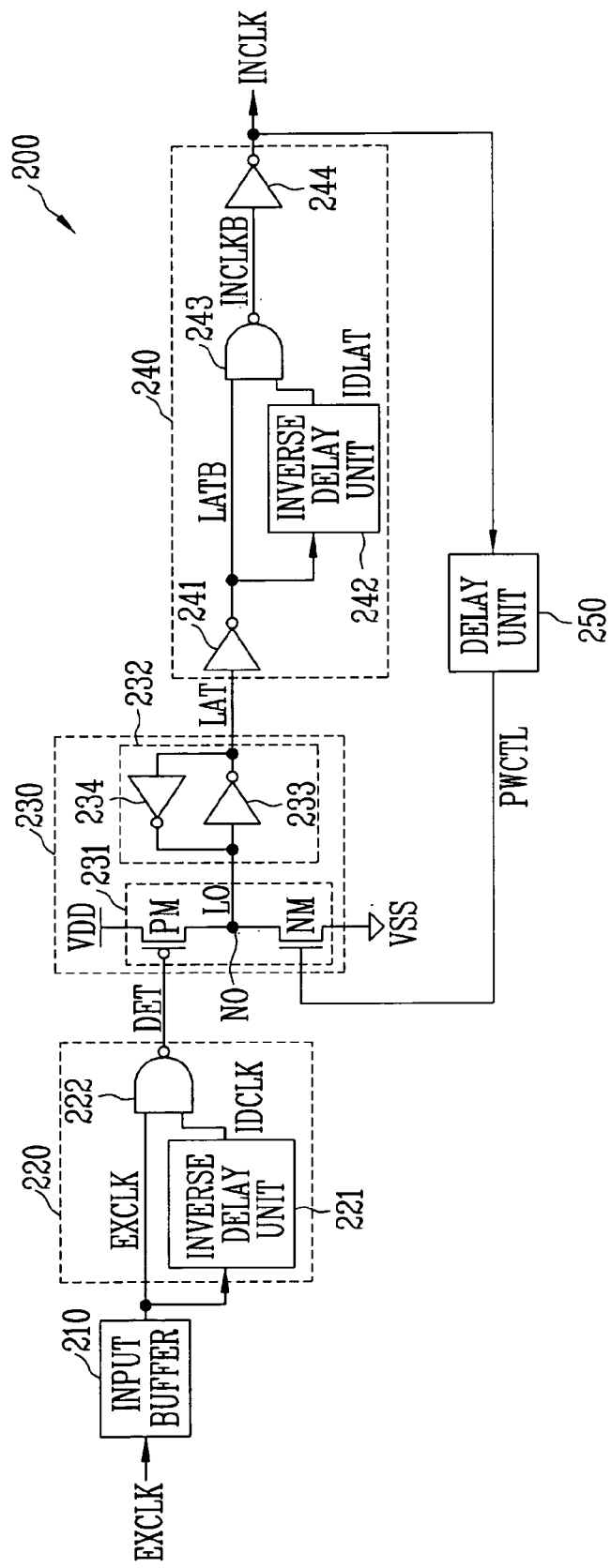
FIG. 5 is a circuit diagram of an internal clock generator according to another embodiment of the present invention.

FIG. 5 is a circuit diagram of an internal clock generator according to another embodiment of the present invention. Referring to FIG. 5, the internal clock generator 200 includes an input buffer 210, a detector 220, an internal signal generator 230, a clock output unit 240 and a delay unit 250. The construction and operation of the internal clock generator 200 is similar to the internal clock generator 100 that has been described with reference to FIG. 3. Accordingly, in the present embodiment, only the differences between the clock generators 200 and 100 will be described. The difference between the clock generators 200 and 100 is that the clock output units 240 and 140 have different constructions. The clock output unit 240 includes inverters 241 and 244, an inverse delay unit 242 and a NAND gate 243. The inverter 241 inverts the internal signal LAT received from the internal signal generator 230 and outputs an inverted internal signal LATB. The inverse delay unit 242 inverts an inverted internal signal LATB, delays the inverted signal for a set time, and outputs an inverted delay signal IDLAT. The NAND gate 243 outputs an internal logic signal INCLKB in response to the inverted internal signal LATB and the inverted delay signal IDLAT. The inverter 244 inverts the internal logic signal INCLKB and outputs an inverted signal as an internal clock signal INCLK.

Figure 6:
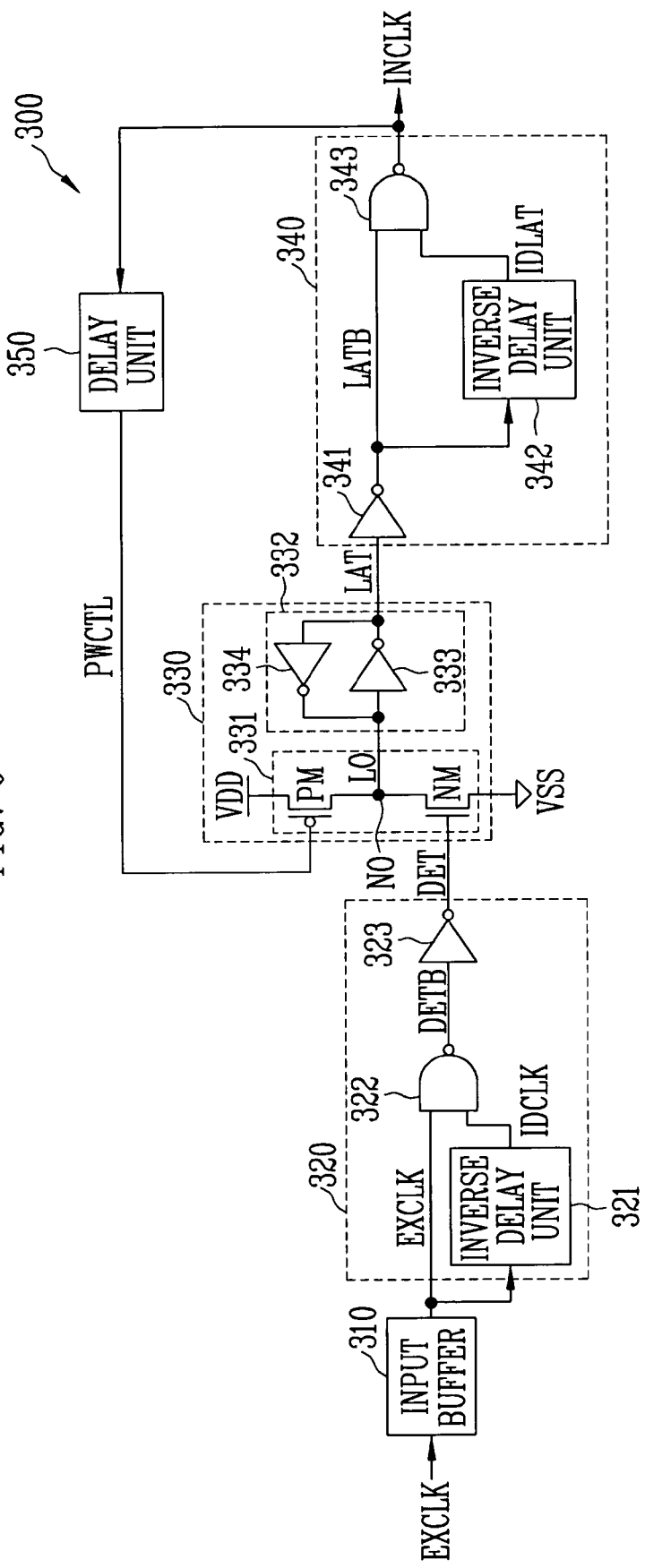
FIG. 6 is a circuit diagram of an internal clock generator according to still another embodiment of the present invention.

FIG. 6 is a circuit diagram of an internal clock generator according to still another embodiment of the present invention. Referring to FIG. 6, the internal clock generator 300 includes an input buffer 310, a detector 320, an internal signal generator 330, a clock output unit 340 and a delay unit 350. The construction and operation of the internal clock generator 300 is similar to the internal clock generator 100 that has been described with reference to FIG. 3. Accordingly, in the present embodiment, only the differences between the clock generators 100 and 300 will be described. The difference between the clock generators 100 and 300 is that detectors 320 and 120 have different constructions and clock output units 340 and 140 also have different constructions. The detector 320 includes an inverse delay unit 321, a NAND gate 322 and an inverter 323. The inverse delay unit 321 inverts an external clock signal EXCLK, delays an inverted signal for a set time and outputs an inverted delay signal IDCLK. The NAND gate 322 outputs an internal detection signal DETB in response to the external clock signal EXCLK and the inverted delay signal IDCLK. The inverter 323 inverts the internal detection signal DETB and outputs an inverted signal as a detection signal DET. The clock output unit 340 includes an inverter 341, an inverse delay unit 342 and a NAND gate 343. The inverter 341 inverts an internal signal LAT received from the internal signal generator 330 and outputs an inverted internal signal LATB. The inverse delay unit 342 inverts the inverted internal signal LATB, delays an inverted signal for a set time and output an inverted delay signal IDLAT. The NAND gate 343 outputs an internal clock signal INCLK in response to the inverted internal signal LATB and the inverted delay signal IDLAT. The difference between the clock generators 300 and 100 is that output circuits 331 and 131 have different operations. A switch PM of the output circuit 331 is turned on or off in response to a pulse width control signal PWCTL received from the delay unit 350. The switch PM of the output circuit 331 is turned on and supplies a power supply voltage VDD to an output node NO. Furthermore, a switch NM of the output circuit 331 is turned on or off in response to a detection signal DET. The switch NM of the output circuit 331 is turned on and supplies a ground voltage VSS to the output node NO. Consequently, the output circuit 331 outputs the internal clock signal LO as a low level when the detection signal DET is a high level, and outputs the internal clock signal LO as a high level when the pulse width control signal PWCTL is a low level.

As described above, in accordance with the internal clock generator and the method of generating the internal clock thereof according to the present invention, a transition point of an external clock signal is detected and an internal clock signal is generated based on the detection result. It is therefore possible to maintain a pulse width of the internal clock signal to a set value regardless of variation in the pulse width of the external clock signal.

Although the foregoing description has been made with reference to the various embodiments, it is to be understood that changes and modifications of the present patent may be made by those having ordinary skill in the art without departing from the spirit and scope of the present patent and appended claims.

What is claimed is:

1. An internal clock generator, comprising:
   a detector for detecting a transition point of an external clock signal and outputting a detection signal;
   an internal signal generator for generating an internal signal in response to the detection signal and a pulse width control signal;
   a clock output unit for outputting an internal clock signal having a pulse width in response to the internal signal and an inverted internal signal of the internal signal; and
   a delay unit for delaying the internal clock signal for a first set time and outputting a delayed signal as the pulse width control signal.

2. The internal clock generator of claim 1, further comprising an input buffer for receiving the external clock signal and outputting the received external clock signal to the detector.

3. The internal clock generator of claim 1, wherein the detector outputs the detection signal as a pulse signal whenever detecting a rising edge of the external clock signal.

4. The internal clock generator of claim 1, wherein the detector comprises:
   an inverse delay unit for inverting the external clock signal, delaying the inverted signal for a set time, and outputting an inverted delay signal; and
   a logic circuit for outputting the detection signal in response to the external clock signal and the inverted delay signal.

5. The internal clock generator of claim 4, wherein the logic circuit outputs the detection signal at a low level when both the external clock signal and the inverted delay signal are a high level.

6. The internal clock generator of claim 4, wherein the logic circuit comprises a NAND gate that receives the external clock signal and the inverted delay signal and outputs the detection signal.

7. The internal clock generator of claim 1, wherein the clock output unit comprises:
   an inverse delay unit for inverting the internal signal, delaying the inverted signal for a second set time, and outputting an inverted delay signal; and an output logic circuit for outputting the internal clock signal in response to the internal signal and the inverted delay signal.

8. The internal clock generator of claim 7, wherein the output logic circuit outputs the internal clock signal at a high level when both the internal signal and the inverted delay signal are at a low level.

9. The internal clock generator of claim 7, wherein the output logic circuit comprises a NOR gate for receiving the internal signal and the inverted delay signal and outputting the internal clock signal.

10. The internal clock generator of claim 7, wherein when the first set time and the second set time are changed, the set pulse width of the internal clock signal is changed.

11. The internal clock generator of claim 7, wherein the first set time is set to be at least as long as the second set time.

12. The internal clock generator of claim 1, wherein the internal signal generator comprises:
an output circuit for outputting an internal output signal at a first or second logic level to an output node in response to the detection signal and the pulse width control signal; and
a latch circuit for latching the internal output signal and outputting the internal signal.

13. The internal clock generator of claim 12, wherein the output circuit comprises:
a first switch for supplying a power supply voltage to the output node in response to the detection signal; and
a second switch for supplying a ground voltage to the output node in response to the pulse width control signal,
wherein when one of the first and second switches operates, the other of the first and second switches does not operate.

14. The internal clock generator of claim 1, wherein the clock output unit comprises:
a first inverter for inverting the internal signal and outputting the inverted internal signal;
an inverse delay unit for inverting the inverted internal signal, delaying the inverted signal for a second set time and outputting an inverted delay signal;
a NAND gate for outputting an internal logic signal in response to the inverted internal signal and the inverted delay signal; and
a second inverter for inverting the internal logic signal and outputting the inverted signal as the internal clock signal.

15. The internal clock generator of claim 1, wherein the detector comprises:
an inverse delay unit for inverting the external clock signal, delaying the inverted signal for a set time, and outputting an inverted delay signal;
a NAND gate for outputting an internal detection signal in response to the external clock signal and the inverted delay signal; and
an inverter for inverting the internal detection signal and outputting the inverted signal as the detection signal.

16. The internal clock generator of claim 15, wherein the internal signal generator comprises:
an output circuit for outputting an internal output signal to an output node in response to the detection signal and the pulse width control signal; and
a latch circuit for latching the internal output signal and outputting the internal signal.

17. The internal clock generator of claim 16, wherein the output circuit comprises:
a first switch for supplying a power supply voltage to the output node in response to the pulse width control signal; and
a second switch for supplying a ground voltage to the output node in response to the detection signal,
wherein when one of the first and second switches operates, the other of the first and second switches does not operate.

18. The internal clock generator of claim 16, wherein the clock output unit comprises:
an inverter for inverting the internal signal and outputting the inverted internal signal;
an inverse delay unit for inverting the inverted internal signal, delaying the twice inverted internal signal for a set time and outputting an inverted delay signal; and
a NAND gate for outputting the internal clock signal in response to the twice inverted internal signal and the inverted delay signal.

19. A method of generating an internal clock, comprising the steps of:
detecting a transition point of an external clock signal and outputting a detection signal;
generating an internal signal in response to the detection signal and a pulse width control signal;
outputting an internal clock signal having a pulse width in response to the internal signal and an inverted internal signal of the internal signal; and
delaying the internal clock signal for a first set time and outputting a delayed signal as the pulse width control signal.

20. The method of claim 19, wherein the step of outputting the internal clock signal comprises the steps of:
inverting the internal signal, delaying the inverted signal for a second set time, and outputting an inverted delay signal; and
outputting the internal clock signal in response to the internal signal and the inverted delay signal.

21. The method of claim 20, wherein when the first set time and the second set time are changed, the set pulse width of the internal clock signal is changed.

22. The method of claim 20, wherein the first set time is at least as long as the second set time.

23. The method of claim 19, wherein the step of generating the internal signal comprises the steps of:
outputting an internal output signal at a first or second logic level to an output node in response to the detection signal and the pulse width control signal; and
latching the internal output signal and outputting the internal signal.

24. The method of claim 19, wherein the step of outputting the detection signal comprises the steps of:
inverting the external clock signal, delaying the inverted signal for a set time, and outputting an inverted delay signal; and
outputting the detection signal in response to the external clock signal and the inverted delay signal.

* * * * *